May 27, 1924.
C. H. CONLON
CYCLE FRAME BRACE
Filed July 23, 1923
1,495,399
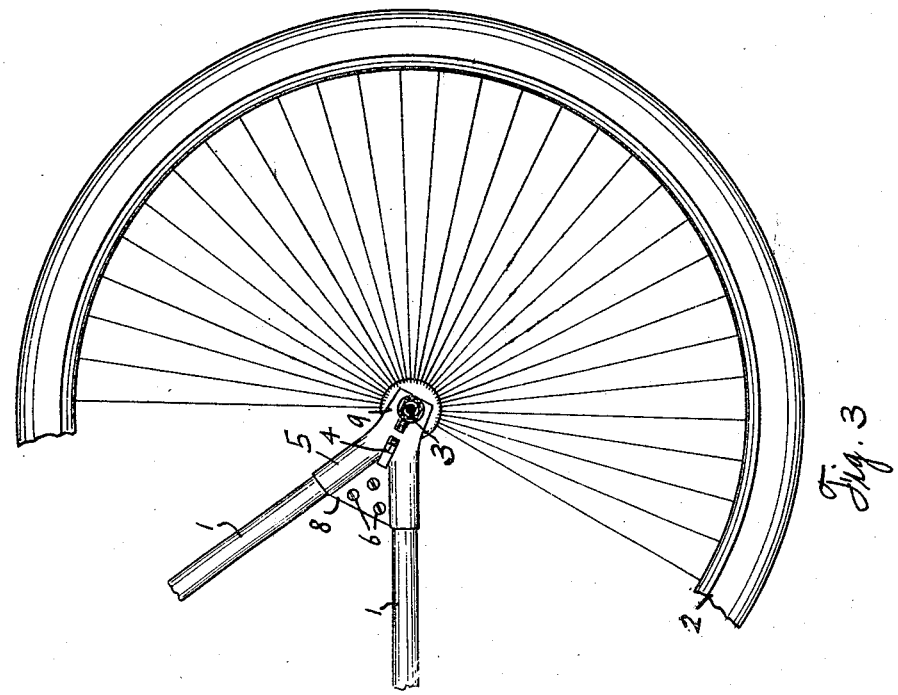
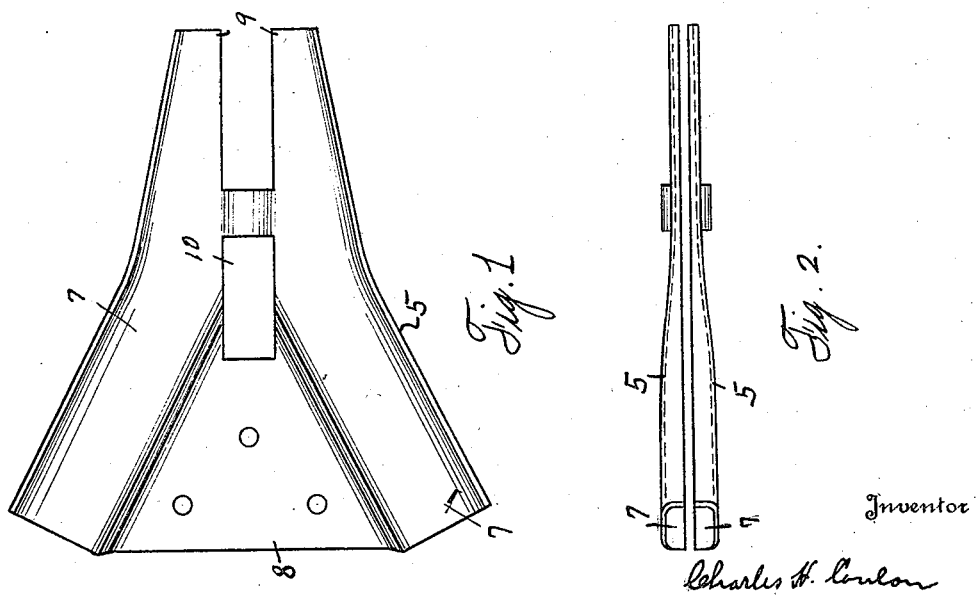

Patented May 27, 1924.

1,495,399

UNITED STATES PATENT OFFICE.

CHARLES H. CONLON, OF GALVESTON, TEXAS.

CYCLE-FRAME BRACE.

Application filed July 23, 1923. Serial No. 653,098.

*To all whom it may concern:*

Be it known that I, CHARLES H. CONLON, a citizen of the United States, residing at Galveston, in the county of Galveston and State of Texas, have invented certain new and useful Improvements in a Cycle-Frame Brace, of which the following is a specification.

This invention relates to new and useful improvements in a cycle frame brace, particularly useful for application to a bicycle frame.

One object of the invention is to provide an accessory of the character described which may be readily applied to the rear forks of the frame to strengthen said frame and forks, and to take the place of distorted or worn forks.

Another object of the invention is to provide a device of the character described, which may be cheaply constructed and readily applied, and which in addition to taking the place of worn out parts, will add to the ornamental appearance of the cycle to which it is applied.

With the above and other objects in view this invention has particular relation to certain novel features of construction and use, an example of which is given in this specification and illustrated in the accompanying drawings, wherein:—

Figure 1 shows an inside view of one of the brace members.

Figure 2 shows a top plan view of a set or pair thereof, and

Figure 3 shows a side view thereof as applied to a bicycle frame.

In the drawings, the numerals 1, 1, designate the rear frame members which, as is well known, terminate at their rear ends where they join, in a slotted fork. The numeral 2 designates the rear bicycle wheel, which runs on a spindle, or axle 3. The opposite ends of the spindle 3 fit into the slots of the forks, one of said forks being on each side of the wheel, as is well known to those familiar with the art. The wheel may be adjusted, so as to regulate the tension on the driving sprocket chain, through the adjusting screws, as 4, which are threaded through the respective forks, of the frame, and whose free ends bear against the respective ends of the spindle 3. In case these forks become distorted or worn out the braces as 5, 5, may be fitted, one on each side of the frame, and secured in place by suitable bolts, as 6.

Each brace member is formed with the V-grooves 7 to receive the corresponding frame members 1, 1, and have the intervening webs 8, through which the securing bolts 6 pass. They also have the slotted forks 9 which take the place of the worn out or distorted ones. These brace members also have the slots 10, so located as to make the adjusting screws 4 accessible and permit the turning of the same.

This accessory may be quickly secured in place, thus providing for the quick and inexpensive repair of the bicycle, the strengthening of the frame thereof, and at the same time improves the appearance of the same.

What I claim is:

1. A frame brace member having a V-groove, a web intervening between the arms of the V-groove, a fork at one end, and a slot aligned with said fork.

2. A brace formed of two members of general triangular contour, each member having a fork at one end, grooves diverging from the fork, and a slot aligned with the fork, and means securing said members in coinciding position.

In testimony whereof I have signed my name to this specification in the presence of two subscribing witnesses.

CHARLES H. CONLON.

Witnesses:
H. B. BISBEY,
A. H. BOCKELMAN.